(No Model.)

R. W. & F. GRINNELL.
AUTOMATIC FIRE EXTINGUISHER.

No. 299,380. Patented May 27, 1884.

WITNESSES:
C. H. Luther Jr.
Wm. L. Cope

INVENTORS
Richard W. Grinnell
Frederick Grinnell
by Joseph A. Miller
attys

UNITED STATES PATENT OFFICE.

RICHARD W. GRINNELL AND FREDERICK GRINNELL, OF PROVIDENCE, RHODE ISLAND.

AUTOMATIC FIRE-EXTINGUISHER.

SPECIFICATION forming part of Letters Patent No. 299,380, dated May 27, 1884.

Application filed January 22, 1883. (No model.)

*To all whom it may concern:*

Be it known that we, RICHARD W. GRINNELL and FREDERICK GRINNELL, both of the city and county of Providence, and State of Rhode Island, have invented a certain new and useful Improvement in Automatic Fire-Extinguishers; and we hereby declare that the following is a full, clear, and exact description of the same, reference being had to the accompanying drawings, forming part of this specification.

This invention has reference to an improvement in automatic fire-extinguishers, in which the outlet is closed by a valve, seal, or cap secured by a solder fusible at a low temperature, which on the occurrence of a fire becomes softened, releases the valve, seal, or cap, and with it the fire-extinguishing fluid restrained by it. The solder used for this purpose is mostly composed of bismuth, and is liable to deteriorate by chemical and molecular action, so that in time it loses its cohesive strength, and the automatic fire-extinguisher is liable to leak. The object of this invention is to strengthen the soldered joint; and it consists in inserting pointed, beveled, or other pins or keys into the parts, as will be more fully set forth hereinafter.

Figure 1:
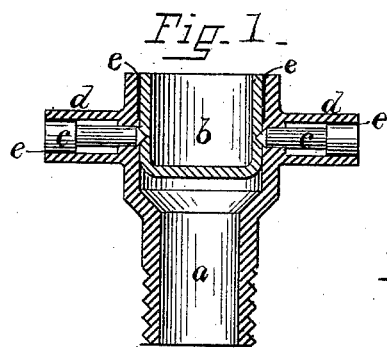
Figure 2:
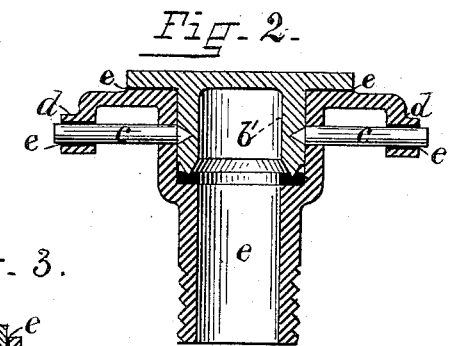
Figure 3:
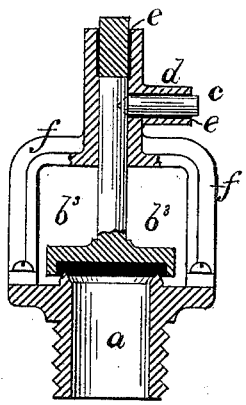
Figure 4:
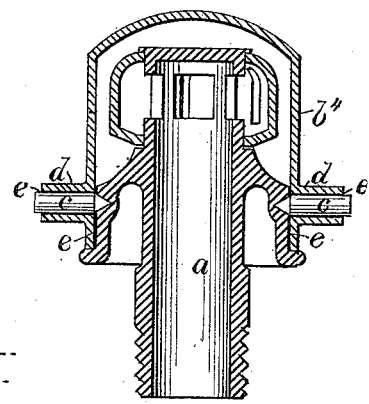

Figure 1 is a sectional view of an outlet closed by a cap secured by solder and held by pins or keys. Fig. 2 is a sectional view of an outlet closed by a seal secured by solder and held by pins or keys. Fig. 3 is a sectional view of an outlet closed by a valve the stem of which is secured by solder and a pin or key. Fig. 4 is a sectional view of an automatic fire-extinguisher covered by a metal cap secured by solder and provided with pins or keys.

In Figs. 1, 2, and 3 any of the well-known means for distributing the fluid may be used, and in Fig. 4 the revolving ring, acting by the reaction of the discharging fluid, or any other form of distributer may be used and covered with the cap.

In the drawings, $a\ a$ are the necks by which the automatic fire-extinguisher is secured to the system of pipes.

$b$, Fig. 1, is an inverted cap closing the outlet. It is secured by the soldered joint $e$, by which the cap is held against the internal pressure.

$c\ c$ are pointed pins or keys, shown round; but they may be square or oblong in section, and have V-shaped or beveled ends.

$d\ d$ are tubes extending laterally beyond the case, either continuous or partly broken away. The pins or keys $c\ c$ extend through these tubes $d\ d$, and through the case into the cap $b$, and they are secured by solder fusible at a low temperature.

In the arrangement illustrated in Fig. 2 the discharge end of the neck $a$ is covered by a plate, $p$, the inner sides of which are united to the end of the neck by solder at $e$, fusible at a low temperature. The plate has an annular rim, $b'$, which enters the discharge-opening of the neck $a$, and the inner edges of said rim rest against a packing-ring, as shown. The pins or keys $c\ c$ in this arrangement are inserted through the tubes $d$, in which they are soldered, as at $e$, and their inner ends enter the rim $b'$, as shown.

In Fig. 3 the valve $b^3$ is held to its seat by the valve-stem, which is secured in the yoke $f$ by fusible solder $e$ and the pins or keys $c$, secured in the laterally-extending tube $d$ by solder $e$. In Fig. 4 the cap $b^4$ is secured by solder to the base of the extinguisher, and by any desired number of pins or keys $c\ c$ secured in laterally-extending tubes or brackets $d$. It will be evident that as long as the pins or keys $c$ are held in the conical or V-shaped cavities the strain on the cap, valve, or seal is resisted by the pins or keys, and that the solder is not subjected to strain. As soon, however, as the soldered joints are sufficiently affected by heat, the movement of the seal will push the pins or keys $c\ c$ outward, owing to the beveled construction of their ends, and the seal will be released. To insure the ready release of the pins or keys when the temperature has reached the melting-point of the solder, the solder-joint holding the pins or keys is removed as much as convenient away from the main joint, and preferably in a horizontal direction, so that the same will be acted upon more quickly than the soldered main joint, and thus the keys will be free to move laterally as soon as the seal, cap, or valve is released. As the strain on the keys or pins *c c* is a shearing strain, very little strain is exerted on the solder holding the same in place, and it is not therefore affected by use, as it is at rest at all times until melted by heat. The main soldered joint is also at rest, and therefore not affected by the continual pressure, the changes in the same, and the occasional extra strain of the water-hammer. All such forces acting continually on a composition of matter—such as soft solder—and, in fact, on all compositions of matter, cause in time a molecular change by which they are weakened.

We do not claim the use of the pins or keys, broadly, to secure two parts together; or in an automatic fire-extinguisher to hold the valve or seal to the outlet, as these form the subject-matter of other applications filed by us at the same time with this application for a patent.

Having thus described our invention, we claim as new and desire to secure by Letters Patent—

The combination, with the extinguisher-body provided with one or more radial sockets, and the valve or valve-stem provided with a corresponding number of recesses, of one or more pins seated in the said sockets, and having tapered ends to enter the said recesses, the said valve or valve-stem and the pins being held by solder, substantially as described.

RICHARD W. GRINNELL.
FREDERICK GRINNELL.

Witnesses:
J. A. MILLER, Jr.,
M. F. BLIGH.